United States Patent [19]

Spiegel et al.

[11] Patent Number: 5,365,151
[45] Date of Patent: Nov. 15, 1994

[54] GAS DISCHARGE LAMP BALLAST CIRCUIT WITH FREQUENCY MODULATED PULSE CONTROL

[75] Inventors: Norbert Spiegel, Dornbirn, Australia; Wolfgang Pabst, Lindau, Germany

[73] Assignee: Tridonic Bauelemente GmbH, Dornbirn, Austria

[21] Appl. No.: 988,962

[22] PCT Filed: Jul. 10, 1992

[86] PCT No.: PCT/EP92/01566

§ 371 Date: Mar. 12, 1993

§ 102(e) Date: Mar. 12, 1993

[87] PCT Pub. No.: WO93/01695

PCT Pub. Date: Jan. 21, 1993

[30] Foreign Application Priority Data

Jul. 12, 1991 [DE] Germany .................. 4123187

[51] Int. Cl.$^5$ ............................. H05B 37/02
[52] U.S. Cl. .................. 315/209 R; 315/307; 315/291; 315/194; 315/DIG. 5; 315/DIG. 7
[58] Field of Search .......... 315/209 R, 307, 291, 315/DIG. 7, DIG. 5, 247, 194

[56] References Cited

U.S. PATENT DOCUMENTS

| | | | |
|---|---|---|---|
| 4,277,728 | 7/1981 | Stevens | 315/291 X |
| 4,373,146 | 2/1983 | Bonazoil et al. | 315/209 |
| 4,912,374 | 3/1990 | Nagase et al. | 315/244 |
| 5,128,593 | 7/1992 | Gilbert | 315/244 |

FOREIGN PATENT DOCUMENTS 0271396 6/1988 European Pat. Off. .
0279489 8/1988 European Pat. Off. .
0439864 8/1991 European Pat. Off. .

*Primary Examiner*—Robert J. Pascal
*Assistant Examiner*—Reginald A. Ratliff
*Attorney, Agent, or Firm*—Fitzpatrick, Cella, Harper & Scinto

[57] ABSTRACT

The application relates to a ballast for the pulsed-mode operation of gas discharge lamps (EVG) and a use of a self-excited or externally controlled half or full bridge circuit for the same purpose. An EVG of the mentioned kind has a buffered feed d.c. voltage ($U_{dc}$, udc) from which the utilized power for the GE lamp or GE lamps can be derived. The load circuit in which the GE lamps are provided has a series-connected choke (L1), if necessary a capacitor (C1) can be connected in parallel to the lamp for ignition purposes. Such a circuit is to be so configured that it is possible to change the characteristic light values, i.e. the light output and the color temperature of the gas discharge lamps (GE). This is to be realized without mechanical choke switching and is achieved in that at least one electronic switching element (S1) or at least one such switching element pair (S1, S2, S3, S4) are provided which supply the choke (L1) and the GE lamp periodically with voltage pulses ($u_{ac}$). The switching element pairs and the voltage pulses ($u_{ac}$) can be frequency modulated (f1, f2) by way of a control signal (f). This frequency modulation can take place stepwise with alternative frequencies or continuously periodically (sine-like) so that a continuous change in the frequency occurs and no disturbing or standing waves which cause optical flickering form in the GE lamp.

23 Claims, 2 Drawing Sheets

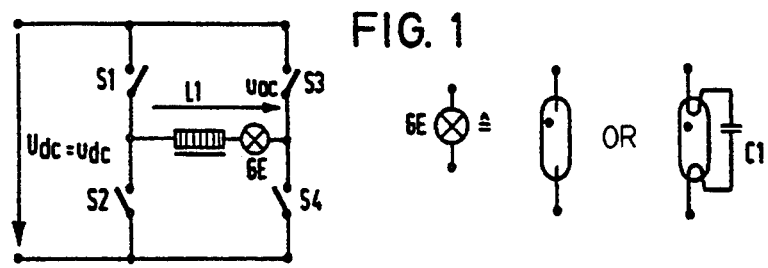
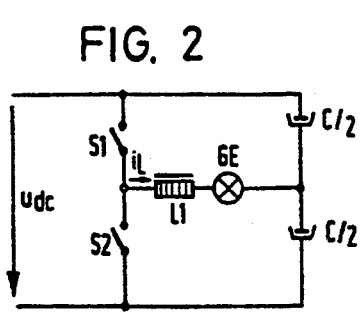
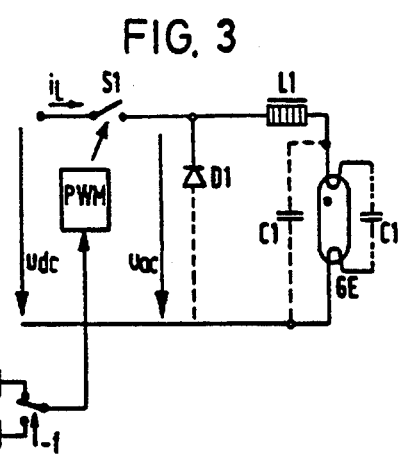
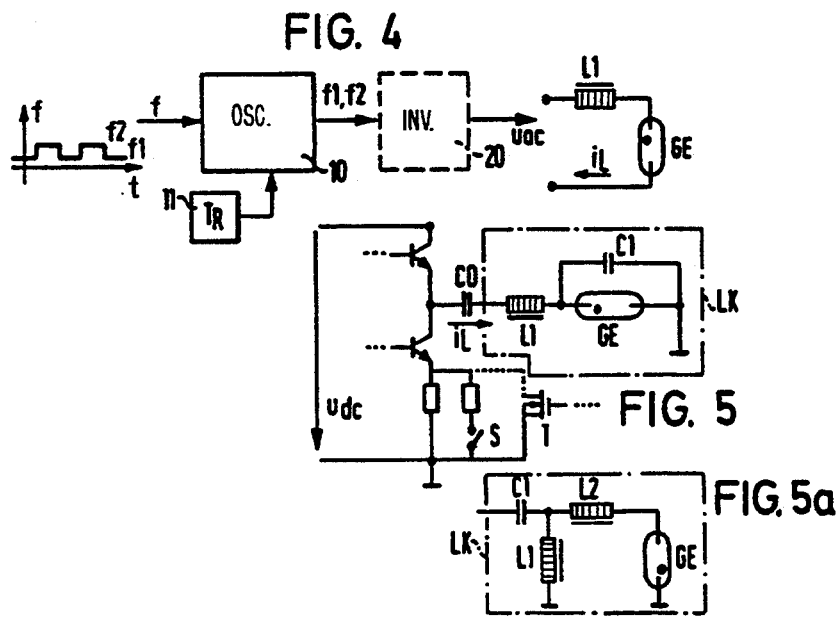

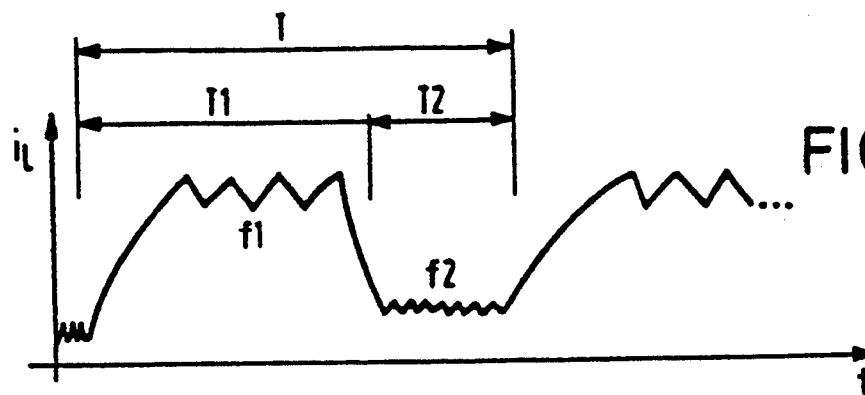
FIG. 6
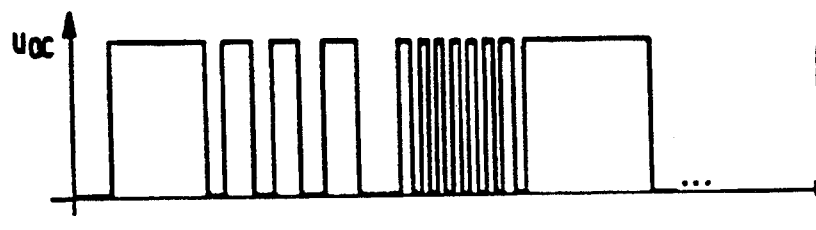
FIG. 7
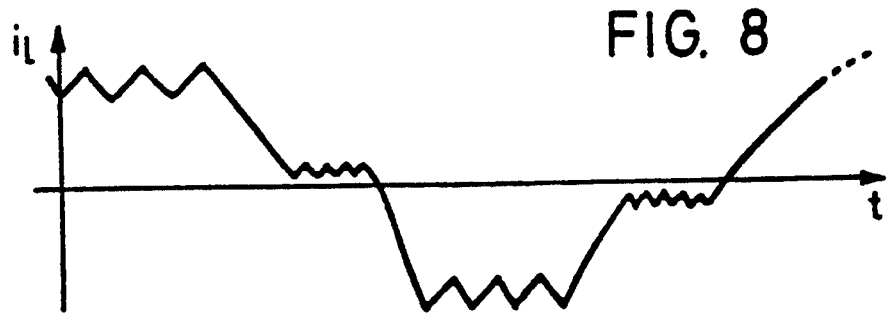
FIG. 8
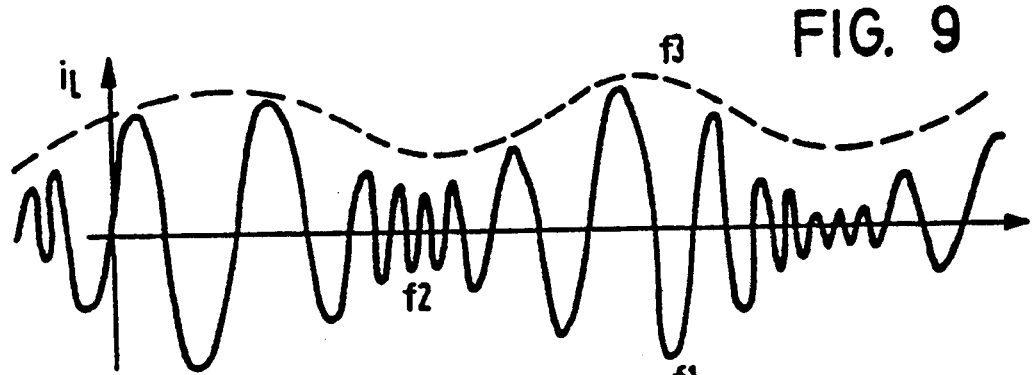
FIG. 9
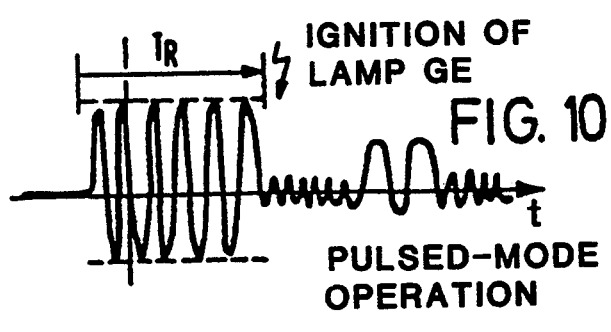
FIG. 10 PULSED-MODE OPERATION
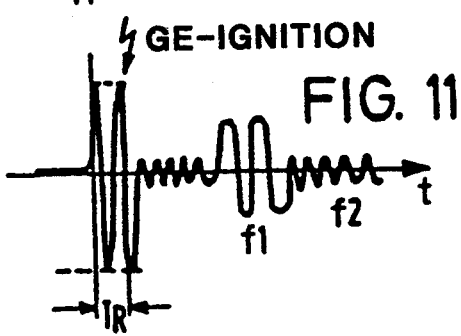
FIG. 11

GAS DISCHARGE LAMP BALLAST CIRCUIT WITH FREQUENCY MODULATED PULSE CONTROL

BACKGROUND OF THE INVENTION

1. Field of the Invention

This invention relates to a ballast for the pulsed-mode operation of gas discharge lamps. More specifically, it concerns the use of a self-excited or externally controlled half or full bridge circuit, likewise for the pulsed mode operation of gas discharge lamps.

2. Description of the Related Art

Conventional electronic ballasts (EVG) serve both to improve brightness control and to make extended and more sparing ignition of high and low pressure gas discharge lamps (GE) possible. Such electronic ballasts supply a frequency in the range of 20 kHz to 70 kHz to a series resonant load circuit. By changing the frequency of the output voltage of the EVG the load current in the series-resonant circuit can be adjusted continuously and in a stepless manner. The gas discharge lamp that is arranged in the load circuit and has the load current flowing through it can thus have its brightness changed in a stepless manner. At the same time, by the output frequency of the EVG approaching the resonant frequency of the load circuit when the lamp is not ignited, a high voltage can be generated at the lamp, to cause the lamp to ignite.

Whilst such EVG's enable comfortable brightness control and ignition, they are not equally suitable to alter the other characteristics of a gas discharge lamp, such as colour temperature or light output (valued luminous flux, lumen/watt).

This can now be achieved by operating a gas discharge lamp periodically with two dissimilar, substantially different current intensities. On the one hand a high current value is applied to the lamp for a certain period and on the other hand the lamp is allowed a recovery time with a substantially lower holding current.

This cycle is repeated periodically so that averaged over time it is ensured that the lamp remains in the conducting state and takes up the lamp nominal power rating $P_N$. By changing the duration of the respective time intervals and the amplitude of the current pulses during each respective time interval the colour temperature and light output of the gas discharge lamps, in particular the Na-high pressure lamps, can be changed. To date, however, this change requires that to achieve different current intensities for the main pulse and the substantially lower holding current pulse the chokes arranged in the load circuit be switched over by additional switches. These switches are expensive and complicated.

SUMMARY OF THE INVENTION

To solve the problem illustrated it is therefore proposed by the invention to avoid switching the chokes and to provide only one choke which, however, is provided periodically via at least one switching element or element pair with voltage pulses, the frequency of the voltage pulses being modulatable by means of a control signal. This achieves modulation of the effective reactance of the load circuit whereby the load current, which also flows through the gas discharge lamp, is as it were also modulated.

A further independent solution of the explained problem is found in the use of the circuits mentioned at the beginning for the pulsed-mode operation of gas discharge lamps, preferably with a pulsation frequency in the range of 50 Hz to 1000 Hz, whereby the gas discharge lamp is arranged in series with an inductance in a load circuit.

The idea on which the explained solution is based is that of controlling the momentary operational overloading of the lamps and the holding current phase by way of a frequency change which involves alternative frequency, stepwise or sine-like, i.e. a continuously, periodically formed frequency change. As the mean value the nominal power rating is reached so that the lamp is not thermally overloaded but the light output and its colour temperature can be changed.

If necessary the holding current could also be dispensed with but it is expedient to retain it so that the lamp does not need to be re-ignited after a main current pulse. It also allows a non-sine-like but similarly constituted, in any event continuing frequency change to avoid standing waves in the lamp which lead to optical disturbances or to unpleasant flickering.

By the additional influence of a pulse width modulator a pulse width modulation can at the same time be introduced along with a distinct change in the frequency within the scope of the frequency modulation. This allows a steady brightness variation of the lamp as it can substantially change the amplitudes of the current intensities by changing the turn-on times.

An additional advantageous effect, with regard to the power loss, is that when a high load current is to be switched the associated operating frequency of the inverter is low and the (high) frequency alternative thereto, with which the holding current flows into the gas discharge lamp, does not significantly load the switch. In this way a high operating frequency can also be effected herewith without additional measures.

When dimensioning the sole reactance it is advantageous, in the case of the stepped frequency change with alternative frequencies, to select a residual ripple of the lamp load current $i_L$ in which disturbing optical waves (flickering) are just avoided. These limits lie, depending on the lamp, between 10% to 30% and are thereby dependent upon the relevant current mean value or current effective value. Here too, the selected frequency alternation is surprisingly advantageous as particularly with high frequency f2 and active small holding current a small ripple is necessary, and this can also be ensured through the high frequency. With reduced frequency f1 the load current increases, with which the main current pulse begins and the current ripple increases, and the current mean value or effective value also increases, which again ultimately ensures that the necessary limit values are maintained, despite a low frequency f1 with the same choke value L1.

The invented ballast is advantageously further developed in that the modulation form is varied in different manners, including pulse width modulation. The polarity reversal according to claim 9, with which uniform loading of the electrodes of the gas discharge lamp is ensured, is particularly advantageous. Specific circuit configurations are described herein. The association of the frequency values f1, f2 with the respective current intensities of the current pulses is taught by claim 9.

According to a specific feature of the invention, a realisation of the continuing, periodic frequency alternation is obtained with an inverter of which the modulation depth can correspond to the amplitude difference between the current main pulse and holding current pulse.

According to further specific features of the invention, it is possible to obtain a lamp-friendly ignition possibility which is ensured by the action of a control circuit with which a high effective voltage can be applied to the gas discharge lamp for a selectable ignition period TR typical of the lamp.

According to another aspect of the invention a self- or externally controlled half or full bridge circuit, as described herein, is used to provide two astable operation points, the one providing a main current pulse and the other providing a holding current pulse which are, averaged over time to provide a lamp-typical nominal power PN in the gas discharge lamp.

BRIEF DESCRIPTION OF THE DRAWINGS

Below, exemplary embodiments illustrate specific forms of the described invention: in the Figures:

FIG. 1 is a current diagram of a first inverter circuit with possible lamp types, FIG. 2 is a current diagram of a second inverter circuit in a half bridge circuit with the same lamp types as shown in FIG. 1, FIG. 3 is a current diagram of a set interruptor circuit arrangement with switchable frequency sources which control the switching element for generating the frequency modulated alternating voltage pulses, FIG. 4 is a block diagram for a rectangular frequency modulation of the output signal of an inverter, FIG. 5 is circuit diagram of an output branch of a self-excited—capacitive or inductive—fed back inverter having a series-resonant load circuit and the possibility of frequency control intervention, FIG. 5a is a current diagram of an alternative load circuit to that of FIG. 5, FIGS. 6 to 8 are timing diagrams of current and voltage characteristics for operation with alternative frequencies, FIG. 9 is a waveform which shows the current characteristic for continuous, periodic operation, and FIGS. 10 and 11 show the ignition procedure.

DETAILED DESCRIPTION OF THE PREFERRED EMBODIMENTS

FIG. 1 shows a typical appearance of a full bridge provided with four switching elements S1, S2, S3, S4, which feeds, from a d.c. voltage $U_{dc}$=udc, a lamp load circuit, comprising a choke L1 and a gas discharge lamp GE, in its bridge branch. This d.c. voltage can be obtained from a battery but it can equally well be a rectified and smoothed alternating voltage, e.g. 220 V/50 Hz mains supply voltage. Types of lamps that can be used are the gas discharge lamps shown in the right-hand part of the Figure, e.g. a high pressure or low pressure gas discharge lamp. A direct, indirect or even non-heated lamp can equally well be used. Depending on the use of one of the aforementioned lamp types, an ignition capacitor C1 can be employed. This is to be connected either in parallel to the electrodes of the non-heated lamp GE or, insofar as a heated lamp is used, in the conventional type of circuit, in which the capacitor C1 connects in each case a terminal of the oppositely situated heating coils.

The bridge circuit is now operated in a manner such that the respective diagonally opposed switches S1, S4 and S2, S3 are switched synchronously with one another so that a bipolar alternating voltage $u_{ac}$ of a high and controllable frequency can be supplied to the load circuit in the bridge branch.

The half bridge circuit shown in FIG. 2, in which one pair of switching elements is replaced by an alternating voltage type middle point (by means of two C/2 capacitances), operates in a comparable manner. The remaining switch pair S1, S2 is hereby however not switched alternately: only one of the two switches is clocked for one selected current direction in the load circuit. If the load current iL is positive, clocking the switch S1 suffices; if the load current iL is negative only the switch S2 need be clocked. As in FIG. 1, free running diodes are obviously provided which are each provided in parallel to the switching elements but are not illustrated.

FIG. 3 shows an interruptor which acts on the load circuit L1 GE with voltage pulses from the d.c. voltage $U_{dc}$, denoted above, via a switch S1 and hereby applies a load current iL into the lamp GE. As in the preceding Figures only one choke L1 is provided. The GE lamp can also be connected in different ways with ignition or smoothing capacitors C1, on the one hand parallel to a non-heated gas discharge lamp or on the other hand in connection with two opposed heating coils. Smoothing or ignition occurs via the above-mentioned capacitor C1.

Furthermore, a control for the switching element S1 is illustrated schematically in FIG. 3, and such control can likewise be used in the preceding Figures. With a modulation frequency f respective ones of two fixed frequencies f1, f2 are selected and supplied, by way of suitable control means, if necessary floating or displaced in potential, to the switching element S1. The two fixed frequencies f1, f2 are the frequencies that are required for a main pulse and a holding current pulse. The frequency f1 is thus selected to have a value of the order of 20 kHz; this represents the low frequency with which the main current pulse is supplied to the load circuit. Its current amplitude amounts to between 1 A and 50 A. After switching over by way of the modulation frequency f, the higher frequency f2 is supplied to the switching element S1. This results in the holding current pulse that is lower in current value. With a frequency between 60 kHz to 200 kHz it lies in a current value range of 50 mA to 500 mA. The modulation frequency f is hereby selected so that, averaged over time, the current values as main current pulse and holding current pulse supply just the nominal power rating to the GE lamp, although the main current pulse supplies it temporarily with a substantially higher power than the nominal power. This achieves the effect that the high pressure lamps can have colour temperature and light output adjusted and can be improved, but at the same time their nominal load is not exceeded. The holding current which is also referred to as "keep alive current" ensures that the lamp remains ionised, i.e. conducting, during the recovery period of the lamp and that re-ignition need not take place before the main current pulse is re-applied.

Hitherto, the realisation of the switching elements S1, . . . S4 has remained unmentioned; they are as a rule formed of bipolar transistors, however MOS-FET transistors or RET transistors can equally well be used.

Like the control circuit explained with reference to FIG. 3, FIG. 4 now shows a similarly designed control circuit. It can equally well be used in the circuit examples shown in FIGS. 1 to 3. The frequencies f1, f2 are here switched over directly by way of a frequency controllable oscillator 10 to which the control signal f—which determines the frequency—is supplied. An oscillator of this kind can be a VCO; the level of the voltage f determines the output frequency f1, f2 of the oscillator 10. The form of the frequency change, i.e. the frequency modulation can also be changed more simply, e.g. can take on a sine-like, triangular-like or any other suitable form; only the voltage form of f is adapted. In FIG. 4, in the left-hand part of the Figure, a rectangular characteristic of the frequency modulation f is shown by way of example. It is comparable to the switching of the fixed frequencies shown in FIG. 3 as it operates so that alternatively either the frequency f1 or the frequency f2 is supplied from the oscillator 10 to the converter 20 that is provided as one of the conversion circuit types described above. The converter 20 then supplies the voltage pulse $u_{ac}$ to the load circuit L1, GE and gives rise to a current $i_L$ which is to be pulsed.

The oscillator 10 is supplemented in FIG. 4 by a monostable flip flop which prevents a frequency alternation or a frequency modulation by way of the input signal f for a predetermined period TR at the turn-on time point. This prevention causes a predetermined fixed frequency, for example only frequency f2, or approximately the load circuit resonance frequency f0, to be supplied to the inverter during the ignition period TR. The ignition period may be in the range of a few milliseconds to seconds and enables sufficient ionisation to build up in the lamp and ignite it gently. Depending on the type of lamp the ignition period TR can be varied depending on whether an ignition-friendly or less readily ignited lamp is used.

In FIG. 5 a self-excited inverter is used to which are connected a coupling capacitor C0, a choke L1 and a gas discharge lamp GE, and a smoothing capacitor C1 in parallel with the latter. The thus formed series resonant load circuit LK has a resonance frequency f0 of the order of magnitude of 1 kHz to 60 kHz which is determined by L1 and C1. It is fed from the output branch—here merely outlined—of the self-commutated inverter (resonance converter) which in turn draws the utilised energy from the d.c. voltage supply Udc. An adjustable emitter resistance is provided in the emitter circuit of the lowest of the power transistors connected in series.

In FIG. 5a an alternative load circuit is shown in which the resonance frequency f0 is likewise determined by L1 and C1 when L2<<L1.

The adjustment of the emitter resistance incorporated in this way allows the desired frequency modulation which, with a series resonant load circuit, leads to an amplitude modulation of the current iL flowing in the load circuit. The adjustment—also modulation—of the emitter resistance can also be effected by connecting in parallel other emitter resistances or by bridging the emitter resistance or by adjustment by means of a control element (MOS-FET Transistor T) connected in parallel. An adjustment of the emitter resistance effects an earlier or later saturation of an inductive coupling element (not shown here) which connects the load current circuit to the control of the transistors of the output circuit. Its saturation then changes the frequency of the self-excited inverter, whereby the goal of modulating the output frequency of the alternating voltage pulses of the inverter is achieved. Apart from the mentioned possibility of changing the emitter resistance of an output transistor of the output branch, the frequency modulation can also be effected by loading an auxiliary winding or a control winding of the inductively coupling transformer which ensures oscillation.

Instead of a self-commutated inverter, an externally commutated inverter can obviously also be used, for example as shown in FIG. 1 or FIG. 2. The voltage frequency modulation effects a current amplitude modulation. This modulation can occur with a predetermined modulation depth which then corresponds to the main current pulse and the holding current pulse in FIGS. 1 to 3. The amplitude modulation occurs with a frequency of from 50 Hz to 1000 Hz so that it remains invisible to the eye. It is hereby advantageous to tune through a plurality of frequencies continuously, so that a specific frequency—as in the stepped frequency alternation—does not exist and standing waves which would lead to optical waves and cause the lamp to flicker are avoided exceptionally well.

The pulsed-mode operation shown in FIG. 5 is thus achieved by pulsating the envelope curve of the output current with a frequency of 50 Hz to 1000 Hz. The amplitude modulation, i.e. the modulation depth, lies in the range of 1:10 to 1:1000.

Ignition of the lamp occurs either by raising the frequency to near the resonance frequency f0, by selectively coupling high voltage pulses or by applying a high ignition voltage to the gas discharge lamp GE for a longer period. In addition a change in pulse duty factor (pulse width modulation) enables the control and adjustment of the output power, i.e. the brightness. Such a brightness variation can equally well be effected by changing the frequency.

In an experiment with a circuit shown in FIG. 5, the waveform shown in FIG. 9 was obtained. Modulation of the frequency occurs in a range of 20 kHz to 70 kHz, and the resonance frequency of the load circuit lies at about 30 kHz and modulation occurs between the above-mentioned frequencies during a period of 20 mec to 1 mec (i.e. between 50 Hz to 1 kHz).

FIGS. 6 to 11 show current and voltage characteristics that are obtained with the converters 20 and the control parts 10 just described.

FIG. 6 shows clearly the pulsed-mode operation of the gas discharge lamp by a current pulse of high amplitude with the frequency f1 which lies in the order of magnitude of 20 kHz. Here the lamp is supplied with power that lies considerably above its nominal rating however for only a short interval T1. The frequency is then adjusted to the substantially higher frequency f2, in the example about 120 kHz. This frequency alternation causes the load current to fall to the now low holding current value during the duration T2. The two durations T1 and T2 lead to a period duration T which lies in the order of magnitude of 200 Hz to 500 Hz. Thereafter, as shown in FIG. 6, a main current pulse follows again which has the above-mentioned frequency f1 during the duration T1. Such a current characteristic as shown in FIG. 6 can be obtained with a control circuit shown in FIG. 4 and with the control signal characteristic f shown in the left part of the Figure. The ratio of the current intensities lies in the range of 1:100 to 1:1000. Their amplitudes can be changed by both frequency variation f1, f2 and by pulse width modulation of a pulse width modulator as shown in FIG. 3. In any case the lamp remains in a conducting state and, averaged over time, is not operated above its nominal power.

FIG. 7 shows the diagram, corresponding to FIG. 6, of the alternating current characteristic at the output of the inverter and at the input of the load circuit L1, GE.

This again makes the frequency alternation apparent, which is shown only schematically.

The frequencies and frequency ratios shown do not correspond in size to the actually obtained relation. They merely show clearly the change of the frequency and the thereby achieved pulsating operation of the GE lamp.

FIG. 8 shows a bipolar current characteristic, attainable with the circuits shown in FIG. 1 or FIG. 2, which helps to spare the lamp and enables uniform utilization of the electrodes. Here—as shown in FIG. 6—a main current pulse and a holding current pulse are applied with distinctly different current amplitudes, however the sign of the current $i_L$ is inverted alternately, i.e. in each second period T. This is achieved, for example, with the circuit shown in FIG. 2 in that the clocking of the switching element S1 is discontinued, whereby the direct current $i_L$ decreases to zero. The clocking of the switching element S2 is then begun whereby the direct current $i_L$ increases in the inverse direction. Both manners of operation are possible; a holding current pulse can be converted—its sign inverted—to a main current pulse, and holding current pulses and main current pulses, which in each case have different current directions, can equally well be converted into one another.

FIG. 9 shows the current characteristic which is obtained with a circuit arrangement shown in FIG. 5, here in particular by sine-like modulation of the frequency by way of the likewise sine-like adjustment of the emitter resistor via a control transistor T; it leads to the amplitude modulation, shown by f3 in FIG. 9, in the series resonant load circuit in FIG. 5. Here too the principle applies that with a high current there is a lower frequency value f1 and with a lower current $i_L$, a higher frequency value f2. Again the advantageous effect exists that with high currents lower operating frequencies and with low currents high operating frequencies, with which the power loss of the output of the self-excited oscillator is minor.

Unlike in FIG. 6 or FIG. 8, in this case no direct current is clocked but an original alternating voltage is applied into the load circuit, the increase of its frequency effects a reduction in the wave amplitude and thus a lower effective value. The statements with regard to the current amplitude values for FIG. 6 and FIG. 8 apply here analogously for the effective value.

Finally, FIGS. 10 and 11 show the effect of the ignition circuit 11 which allows a high alternating voltage to be applied to the lamp GE from the converter 20 for a predetermined period TR. When switching on, the monostable flip flop 11 first suppresses the steadily provided frequency modulation or frequency alternation f1, f2, by holding the output frequency of the converter 20 and of the oscillator 10 to a predetermined—low— value. This value lies near the resonance frequency f0 with which the still undamped—the lamp has not yet ignited—resonance circuit supplies high ignition voltage.

After successful ignition the effect of the monostable flip flop 11 on the oscillator 10 is removed so that the steady operation, i.e. the modulation and pulsation of the current can be utilized. The ignition achieved in this way corresponds to a cold start. If desired hot start can be provided by utilizing the ignition capacitor C1 as shown in FIG. 1.

If the pulsed-mode operation of gas discharge lamps allows a change in their characteristics and an improvement in their light output, this is achieved according to the exemplary embodiments of FIG. 3 and appropriate control of the device shown in FIGS. 1 and 2, by retaining a single choke and by an alternating astable exchange between two frequencies. This frequency modulation leads to a change in the effective reactance f.L1, which gives rise to a current main pulse—with low frequency—and a holding current pulse—with high frequency f2. The respective amplitudes and intervals T1, T2 of the pulses are tuned so that averaged over time T the lamp is supplied with the power $P_N$. The direct change of the lamp current by frequency modulation of the voltage $u_{ac}$ corresponds, with an inverter as shown in FIG. 5 or FIGS. 1 or 2 (with appropriate control), to the indirectly obtained amplitude modulation which is effected by frequency modulation of an alternating voltage signal that is supplied to the load circuit (L1, GE). This amplitude modulation or amplitude modulation-like envelope curve f3 reproduces the pulsed-mode operation described above. Its maxima correspond to the main current pulses, its minima correspond to the holding current pulses. If the type of frequency modulation is varied, e.g. from a sine-like modulation to a rectangular modulation, e.g. by changing the emitter resistor stepwise—the envelope curve f3 is also adapted correspondingly. This can extend from a sine form to a rectangular form.

In the case of frequency alternative operation the ripple content remaining in the load current due to the smoothing effect of the choke deserves particular attention. It must not exceed a predetermined threshold value that is dependent upon the level of the respective active current pulse. When the frequency is increased the current decreases, at the same time the higher frequency has the effect that control precision is sufficient, i.e. the limits of the ripple content are not exceeded. The ripple amplitude thus in relation to the total current remains approximately constant or lies in the tolerable range. Disturbing acoustic and optical waves in the lamp cannot arise or be caused; the light effect remains uniform to the observer.

The selection of choke value L1 is likewise of importance since it determines the ripple content that must not exceed particular limits. Aside from determining the choke value, however, adaptation to a predetermined choke value by changing the fixed frequencies f1, f2—as in FIG. 3—can also be achieved, whereby the level of the current pulses can be adjusted relatively freely and over an extensive range. Thus the choke and said frequencies can be selected in a such manner that a greater or lesser separation between the permitted ripple amplitude and the critical value is provided.

The smooth shifting of the control frequency towards or away from the resonance frequency f0 for igniting and brightness control purposes, already mentioned above, will not be described in more detail. However, it can, for specific applications, indeed be added supplementarily to the circuit arrangements for pulsed-mode operation of lamps described herein, within the scope of the invention. This depends on the particular application.

We claim:

1. A ballast for the pulsed-mode operation of gas discharge lamps having a buffered feed d.c. voltage from which the utilized power for the lamps can be derived, said ballast comprising a reactance,
   a circuit for connecting said reactance in series with a lamp, and at least one electronic switching device connected to supply the reactance and the lamp periodically with voltage pulses of first and second different frequencies, respectively, and which are, frequency modulated in response to a control signal, the switching device including at least one switching element connected as an interrupter and further including a free running diode connected to take up load current of the load circuit comprising the lamp and the reactance when the switching element is non-conductive.

2. A ballast according to claim 1, characterized in that the switching device is arranged to effect the frequency modulation with alternative frequencies.

3. A ballast according to claim 2 characterized in that said switching device is constructed such that a first frequency in the range of 10–30 kHz is supplied to the load circuit via at least one switching element for a predetermined first interval, and for a predetermined second interval second frequency in the range of 50–120 kHz, is supplied, and such that the frequency alternation occurs with an alternation frequency that lies in the range of 200 Hz–500 Hz.

4. A ballast according to claim 3 characterized in that a series capacitor is included in the load circuit.

5. A ballast according to claim 1 characterized in that the switching device includes a pulse width modulator connected to influence said control signal whereby the voltage pulses are frequency modulated.

6. A ballast according to claim 3 characterized in that said switching device is arranged to supply voltage pulses of different frequencies stepwise to a load circuit comprising said lamp and said reactance such that during a first predetermined interval a current pulse of a first predetermined frequency and in the range of 1–50 Amp. is supplied to said load circuit, and during a second interval a lesser current pulse of a second predetermined frequency and in the range of 50–500 Milliamp., is supplied to the load circuit.

7. A ballast according to claim 6, characterized in that said switching device is constructed and arranged to permit adjustment of the amplitudes of the respective current pulses to the characteristics of the lamp and of the selected reactance by adjustment of the frequencies of the pulses.

8. A ballast according to claim 6 characterized in that said switching device is constructed and arranged to change the amplitudes of the respective current pulses by varying the pulse duty factor.

9. A ballast according to claim 6, characterized in that said switching device is constructed and arranged such that the total power, comprising said current pulses supplied to the lamp during one period, does not exceed the nominal power rating of said lamp.

10. A ballast according to claim 2, characterized in that said ballast includes a converter in the load circuit comprising said lamp and said reactance and arranged to produce continuous periodic frequency modulation, and wherein said switching device is constructed and arranged such that said frequency modulation produces an amplitude modulation of the alternating voltage in the range of 50 Hz to 1 kHz of the alternating voltage supplied to the lamp and the modulation ratio lies in the range of 1:10 to 1:1000.

11. A ballast according to claim 10, characterized in that the modulation depth corresponds substantially to the amplitude difference between successive pulses of different frequency.

12. A ballast according to claim 2, characterized in that said switching device includes a control circuit which suppresses the frequency alternation for a predetermined lamp-type-dependent period and only after the predetermined period allows the alternation of the voltage pulses.

13. A ballast according to claim 12, characterized in that the control circuit is arranged to intervene in the ignition of the lamp in the manner of a monostable flip flop, but does not influence regular operation of the lamp, and each initial intervention gives rise, for a predetermined period of time, to a frequency for the voltage pulses which lies near the resonance frequency of the load circuit when the lamp is not ignited.

14. A ballast according to claim 2, wherein the switching device includes a pulse width modulator connected to influence said control signal whereby the voltage pulses are frequency modulated.

15. A ballast according to claim 2 wherein a series capacitor is included in the load circuit.

16. A ballast according to claim 1 wherein said switching device is arranged to supply voltage pulses of different frequencies stepwise to a load circuit comprising said lamp and said reactance such that during a first predetermined interval a current pulse of a first predetermined frequency and in the range of 1–50 Amp. is supplied to said load circuit, and during a second interval a lesser current pulse, of a second predetermined frequency and in the range of 50–500 Milliamp., is supplied to the load circuit.

17. A ballast according to claim 16, wherein said switching device is constructed and arranged to cause the current pulses, during a first period which corresponds to the total of the first and second intervals, to have a positive polarity and during a subsequent period to have a negative polarity.

18. A ballast according to claim 1, wherein said switching device is constructed and arranged to cause the current pulses, during a first period which corresponds to the total of the first and second intervals, to have a positive polarity and during a subsequent period to have a negative polarity.

19. A ballast according to claim 16, wherein said switching device is constructed and arranged to change the amplitudes of the respective current pulses by varying the pulse duty factor.

20. A ballast according to claim 1 characterized in that said switching device is constructed and arranged to cause the current pulses, during a first period which corresponds to the total of the first and second intervals, to have a positive polarity and during a subsequent period to have a negative polarity.

21. A ballast according to claim 20, wherein said switching device is constructed and arranged to change the amplitudes of the respective current pulses by varying the pulse duty factor.

22. A ballast according to claim 17, wherein said switching device is constructed and arranged to change the amplitudes of the respective current pulses by varying the pulse duty factor.

23. A ballast for the pulsed-mode operation of gas discharge lamps having a buffered feed d.c. voltage from which the utilized power for the lamps can be derived, said ballast comprising a reactance,
a circuit for connecting said reactance in series with a lamp, and
a plurality of electronic switching devices connected to supply the reactance and the lamp periodically with voltage pulses of first and second different frequencies, respectively, and which are frequency modulated in response to a control signal, said plurality of switching devices being connected in a bridge circuit, with first and second pairs of said switching devices each comprising two series-connected power semiconductors, said pairs each being connected across a feed d.c. voltage source, and a load circuit comprising said lamp and said reactance being arranged in one branch of the bridge circuit.

* * * * *